(12) United States Patent
Sim et al.

(10) Patent No.: US 12,283,101 B2
(45) Date of Patent: Apr. 22, 2025

(54) APPARATUS AND METHOD FOR RECOGNIZING WHETHER ACTION OBJECTIVE IS ACHIEVED

(71) Applicant: Electronics and Telecommunications Research Institute, Daejeon (KR)

(72) Inventors: Dong Jin Sim, Daejeon (KR); Jin Young Moon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 451 days.

(21) Appl. No.: 17/711,609

(22) Filed: Apr. 1, 2022

(65) Prior Publication Data

US 2022/0319169 A1    Oct. 6, 2022

(30) Foreign Application Priority Data

Apr. 2, 2021    (KR) .................. 10-2021-0043463

(51) Int. Cl.
*G06V 20/40*    (2022.01)
*G06V 10/40*    (2022.01)
(Continued)

(52) U.S. Cl.
CPC .............. *G06V 20/41* (2022.01); *G06V 10/40* (2022.01); *G06V 10/774* (2022.01); *G06V 20/46* (2022.01); *G06V 20/52* (2022.01)

(58) Field of Classification Search
CPC ...... G06V 20/41; G06V 10/40; G06V 10/774; G06V 20/46; G06V 20/52; G06V 10/82; G06V 20/42; G06V 20/40
See application file for complete search history.

(56) References Cited

U.S. PATENT DOCUMENTS 9,183,431 B2    11/2015 Kim et al.
10,262,239 B2    4/2019 Polak et al.
(Continued)

FOREIGN PATENT DOCUMENTS

EP    3690768    8/2020
JP    2014-006663    1/2014
(Continued)

OTHER PUBLICATIONS

Moon, Jinyoung et al., "Trends in Temporal Action Detection in Untrimmed Videos," Electronics and Telecommunications Trends, Jun. 1, 2020, pp. 20-33, vol. 35, No. 3, Electronics and Telecommunications Research Institute, Daejeon, Republic of Korea.

*Primary Examiner* — Molly Wilburn
(74) *Attorney, Agent, or Firm* — KILE PARK REED & HOUTTEMAN PLLC

(57) ABSTRACT

Provided are an apparatus and method for recognizing whether an action objective is achieved. The apparatus includes a video feature extraction module configured to receive a video and output a video feature sequence through an operator, such as a convolution operator, an action case memory module configured to compress and store action case information for each action type and each of success and failure groups transmitted from the video feature extraction module and return the action case information according to a query including a pair of an action type and whether the action is successful, and an action success or failure determination module configured to receive a pair of a video feature sequence and an action type identifier and output whether an action of the given video feature sequence is successful in connection with the action case memory module.

19 Claims, 10 Drawing Sheets

(51) Int. Cl.
    *G06V 10/774*     (2022.01)
    *G06V 20/52*     (2022.01)

(56) References Cited

U.S. PATENT DOCUMENTS

| | | | |
|---|---|---|---|
| 10,766,137 B1 * | 9/2020 | Porter | G06N 3/04 |
| 10,789,458 B2 | 9/2020 | Kim et al. | |
| 2012/0185499 A1 | 7/2012 | Alpern et al. | |
| 2019/0266407 A1 * | 8/2019 | Gupta | G06V 10/764 |

FOREIGN PATENT DOCUMENTS

| | | |
|---|---|---|
| JP | 6037325 | 12/2016 |
| KR | 10-1957604 | 3/2019 |
| KR | 10-2071532 | 1/2020 |
| KR | 2021-0013865 | 2/2021 |

* cited by examiner

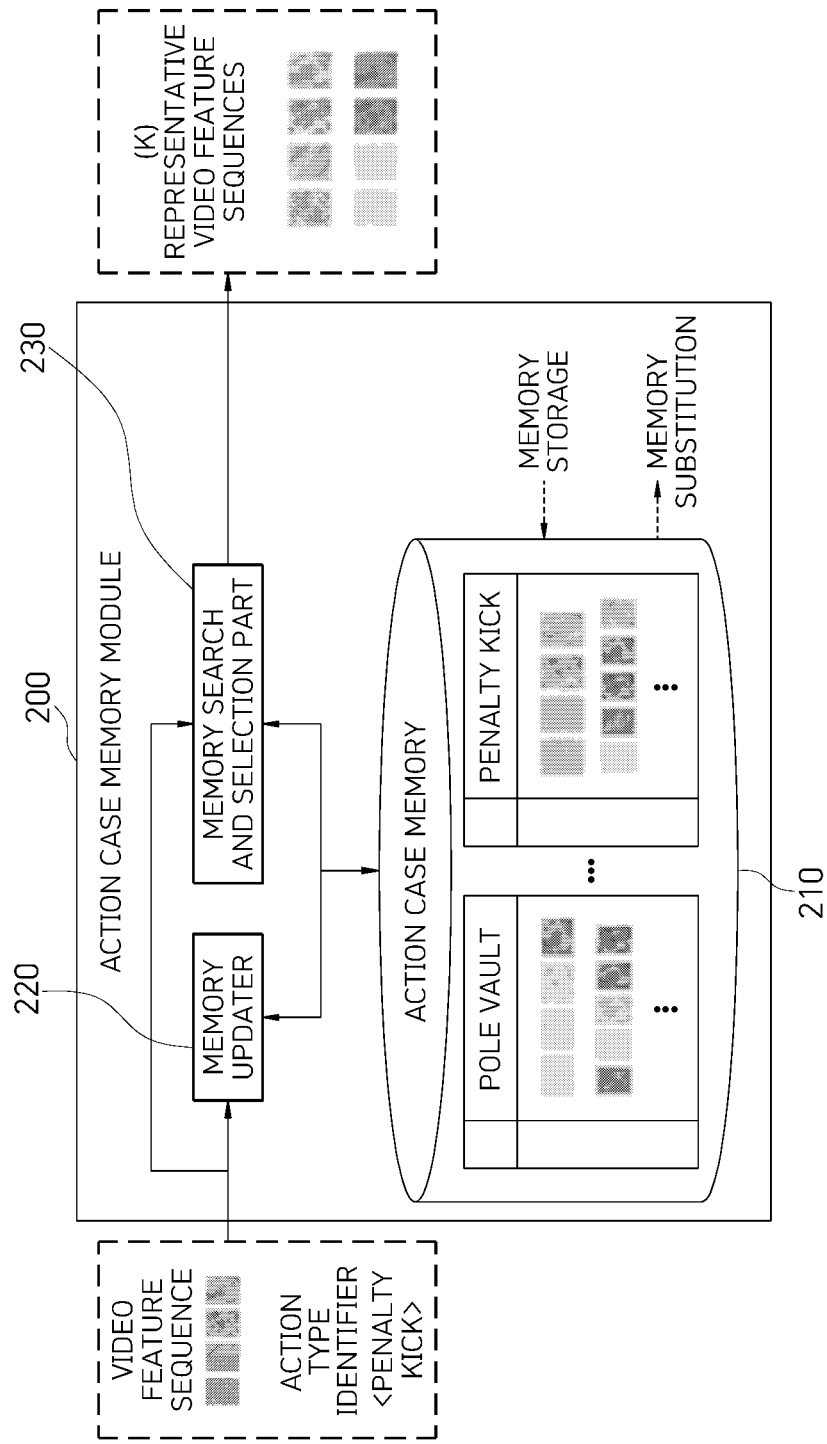

APPARATUS AND METHOD FOR RECOGNIZING WHETHER ACTION OBJECTIVE IS ACHIEVED

CROSS-REFERENCE TO RELATED APPLICATION

This application claims priority to and the benefit of Korean Patent Application No. 10-2021-0043463 filed on Apr. 2, 2021, the disclosure of which is incorporated herein by reference in its entirety.

BACKGROUND

1. Field of the Invention

The present invention relates to computer vision and, more particularly, to a method of detecting whether an objective of an action observed in a video is achieved.

2. Discussion of Related Art

It is important for computer vision artificial intelligence models which understand actions observed in videos not only to determine what kinds of action are taken but also to determine whether the actions are accurately and well done, that is, whether the actions are successful.

In the healthcare field in which artificial intelligence models are frequently used, it is necessary to determine whether a patient takes medicine in a prescribed order or according to a prescribed amount or determine whether a patient pretends to take medicine.

Otherwise, for exercise coaching, it is important to supervise whether a person does given exercises in accurate postures.

Also, in the manufacturing field, assembly machines are required to determine whether parts are securely fixed and mounted so as to prevent dangerous situations.

Meanwhile, a current artificial intelligence model, which determines whether the objective of an action in a video is achieved or whether the action is successful, evaluates whether the action in the video is successful on the basis of explicitly provided conditions for achieving the objective.

However, in terms of cost, it is difficult to explicitly provide criteria for meeting the conditions in order to evaluate various actions.

In the case of push up actions, there are various conditions to be satisfied such as bending the elbows up to a specific angle or more, straightening the knees at 180 degrees, and lowering the shoulders below the neck.

It is expensive to provide explicit conditions in a form that is easy for an artificial intelligence model to learn.

Also, for video recognition, there are constraints on the distance between a video recording device and an object, an imaging angle, time, and the like.

SUMMARY OF THE INVENTION

The present invention is directed to providing an apparatus for recognizing whether an action objective is achieved that trains an artificial intelligence model determining whether an in-video action is successful only on the basis of a dataset of the types of actions, action videos in which objectives of the actions are achieved, and videos in which objective of the actions are not achieved without details of explicit success conditions.

The present invention is also directed to providing an apparatus for recognizing whether an action objective is achieved that determines whether an action is successful in videos captured in various environments without special restrictions on videos.

In other words, the present invention is directed to providing an apparatus for recognizing whether an action objective is achieved that enables various people to be imaged in various places and various time sections and may determine whether an action is successful regardless of the length of a video.

Objects of the present invention are not limited to those described above, and other objects which have not been described above will be clearly understood by those of ordinary skill in the art from the following descriptions.

According to an aspect of the present invention, there is provided an apparatus for recognizing whether an action objective is achieved, the apparatus including a video feature extraction module configured to receive a video and output a video feature sequence through an operator, such as a convolution operator, an action case memory module configured to compress and store action case information for each action type and each of success and failure groups transmitted from the video feature extraction module and return the action case information according to a query including a pair of an action type and whether the action is successful, and an action success or failure determination module configured to receive a pair of a video feature sequence and an action type identifier and output whether an action of the given video feature sequence is successful in connection with the action case memory module.

The received video may include a two-dimensional (2D) or three-dimensional (3D) video or a bundle of at least one image.

The received video may be one of a pre-stored video file and a continuously stored streaming video such as a closed-circuit television (CCTV) video.

The video feature extraction module may set a single image as a video feature extraction unit and set a bundle of two or more images as one unit.

A method of extracting features of the video may be one of a 2D convolution operator, a 3D convolution operator, a pooling operation, and a multi-perceptron operation which are used in the image recognition field.

The action success or failure determination module may receive the video feature sequence and information on the action type identifier from the video feature extraction module, transmit the video feature sequence and the information on the action type identifier to the action case memory module, and generate a combined response sequence by passing a representative video feature sequence returned from the action case memory module and the received video feature sequence through a sequence mapper.

The action success or failure determination module may include sequence mappers configured to output reference sequences, in which a query sequence represented in a feature space and a representative video feature sequence are combined by mapping the query sequence to the representative video feature sequence, a sequence determiner configured to receive the reference sequences output from the sequence mapper and output video feature sequences, and a comprehensive determiner configured to output a final determination value for the video feature sequences in consideration of outputs of the video feature sequences for the sequence mappers.

The sequence determiner and the comprehensive determiner may include an operator for processing a data sequence having an arbitrary length and returning a value for a final determination and may be many-to-one recurrent neural networks.

The apparatus may further include a learning module configured to generate action success determination training data using the final determination value, which corresponds to success information and is output through the comprehensive determiner, and learn a factor of each of the sequence mappers, the sequence determiner, and the comprehensive determiner.

The action success determination training data may include video data, in-video action information, and information representing a success determination result in the basic form of <video, action type identifier, success information> and may further include additional information such as a criterion for action success.

The learning module may include an action success determiner configured to determine an action success determination error which is a difference between an action success determination value, which is output when the video, action information, and optionally additional information, such as the criterion for action success, are passed through the module, and an action success determination value in training data and an optimizer configured to optimize factors of the video feature extraction module, the action success or failure determination module, and the action case memory module when action success determination training data is given so that the action success determination error may be minimized.

According to another aspect of the present invention, there is provided a method of recognizing whether an action objective is achieved, the method including receiving, by a video feature extraction module, a video and an action type identifier, outputting, by the video feature extraction module, a video feature sequence from the received video through a convolution operator, requesting a representative video feature sequence from an action case memory module using the received action type identifier and the video feature sequence, and outputting whether an action of the video feature sequence input through the video feature extraction module is successful using the representative video feature sequence provided by the action case memory module.

The method may further include compressing, by an action success or failure determination module, action case information for each action type and each of success and failure groups transmitted from the video feature extraction module and storing the compressed action case information in the action case memory module, and when a query including a pair of an action type and whether the action is successful is received, providing, by the action case memory module, a representative video feature sequence corresponding to a requested action type identifier to the action success or failure determination module.

The outputting of the video feature sequence may use one of a 2D convolution operator, a 3D convolution operator, a pooling operation, and a multi-perceptron operation which are used in the image recognition field.

The outputting of whether the action of the video feature sequence is successful may include outputting reference sequences, in which a query sequence represented in a feature space and a representative video feature sequence are combined by mapping the query sequence to the representative video feature sequence, receiving the reference sequences output from sequence mappers and outputting video feature sequences, and outputting a final determination value for the video feature sequences in consideration of outputs of the video feature sequences for each of the sequence mappers.

The outputting of the video feature sequences and the outputting of the final determination value may use an operator for processing a data sequence having an arbitrary length and returning a value for a final determination and may be performed through a many-to-one recurrent neural network.

The method may further include generating action success determination training data using a final determination value, which corresponds to success information and is output through a comprehensive determiner, and training each of the sequence mappers, the sequence determiner, and the comprehensive determiner using a factor of the generated action success determination training data.

The action success determination training data may include video data, in-video action information, and information representing a success determination result in the basic form of <video, action type identifier, success information> and may further include additional information such as a criterion for action success.

The training of each of the sequence mappers, the sequence determiner, and the comprehensive determiner may include determining an action success determination error which is a difference between an action success determination value, which is output when the video, action information, and optionally additional information, such as the criterion for action success, are passed through the above module, and an action success determination value in training data, and optimizing factors of the video feature extraction module, the action success or failure determination module, and the action case memory module when action success determination training data is given so that the action success determination error may be minimized.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 6 is a reference diagram illustrating a configuration and an operation process of an action case memory module shown in FIG. 1;

DETAILED DESCRIPTION OF EXEMPLARY EMBODIMENTS

Advantages and features of the present invention and methods for accomplishing the same will become apparent from exemplary embodiments described in detail below with reference to the accompanying drawings. However, the present invention is not limited to the exemplary embodiments set forth herein but may be implemented in various different forms. The exemplary embodiments are provided only to make disclosure of the present invention thorough and to fully convey the scope of the invention to those of ordinary skill in the art, and the present invention is defined by only the scope of the claims. Meanwhile, terms used in this specification are for describing the exemplary embodiments rather than limiting the present invention. In this specification, singular forms include plural forms unless expressly stated otherwise. As used herein, the term "comprises" and/or "comprising" does not preclude the presence or addition of one or more components, steps, operations and/or devices other than stated components, steps, operations and/or devices.

Figure 1:
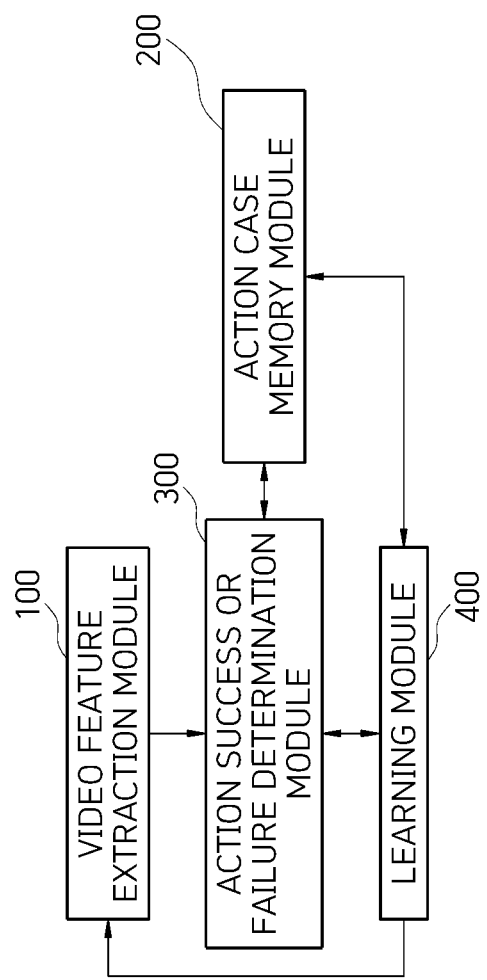
FIG. 1 is a block diagram illustrating an apparatus for recognizing whether an action objective is achieved according to an exemplary embodiment of the present invention.
Figure 2:
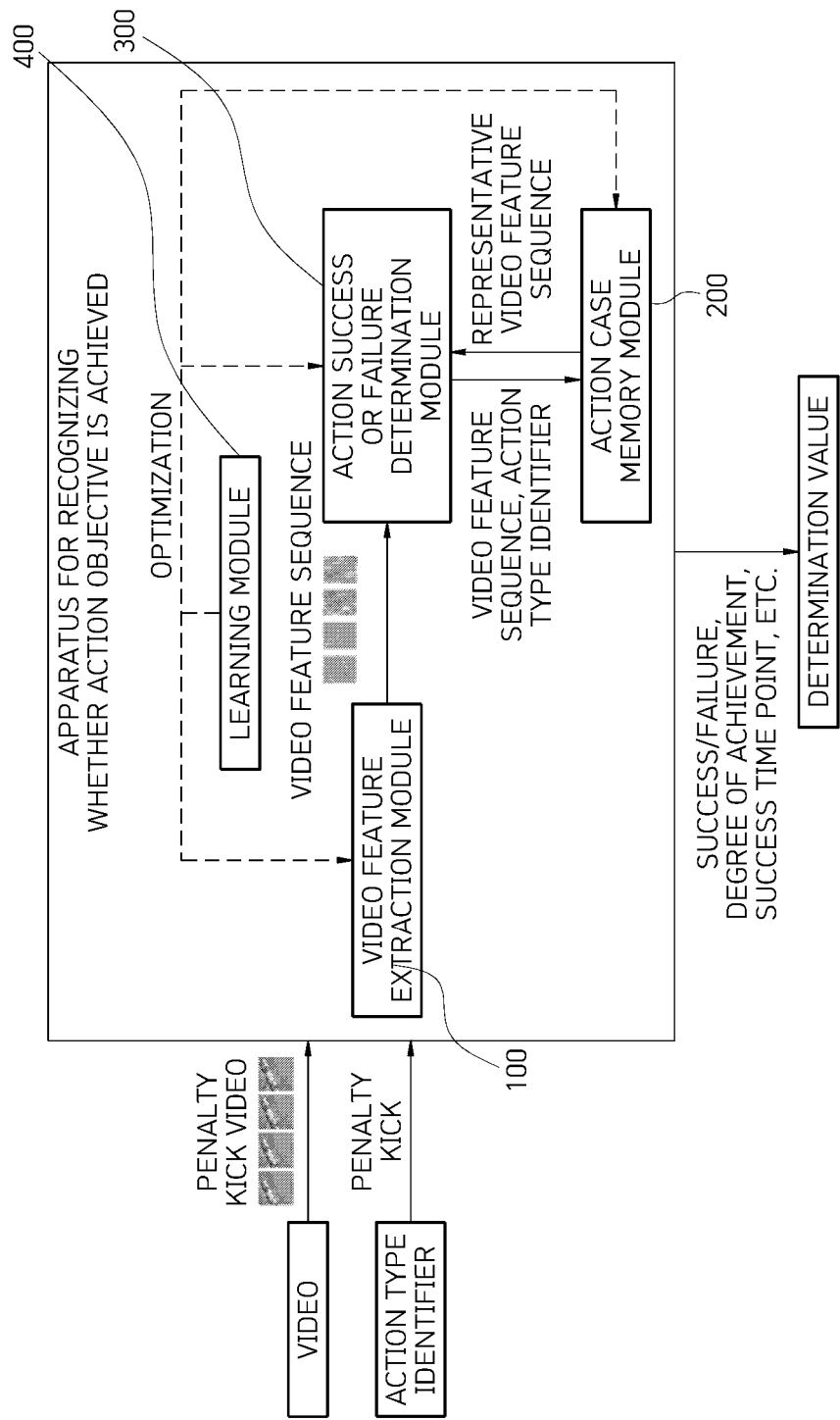
FIG. 2 is a reference diagram illustrating operations of the apparatus for recognizing whether an action objective is achieved according to the exemplary embodiment of the present invention.

FIG. 1 is a block diagram illustrating an apparatus for recognizing whether an action objective is achieved according to an exemplary embodiment of the present invention, and FIG. 2 is a reference diagram illustrating operations of the apparatus for recognizing whether an action objective is achieved according to the exemplary embodiment of the present invention.

As shown in FIG. 1, the apparatus for recognizing whether an action objective is achieved according to the exemplary embodiment of the present invention includes a video feature extraction module 100, an action success or failure determination module 300, an action case memory module 200, and a learning module 400.

The video feature extraction module 100 receives a video and outputs a video feature sequence to the action success or failure determination module 300 through an operator such as a convolution operator. According to the exemplary embodiment of the present invention, the received video may include a two-dimensional (2D) or three-dimensional (3D) video or a bundle of at least one image. The input video may include a pre-stored video file, a continuously stored streaming video, such as a closed-circuit television (CCTV) video, etc. and a protocol suitable for each received video may be provided. For convenience of description, a 2D video is assumed.

The action case memory module 200 compresses and stores action case information for each action type and each of success and failure groups and returns the action case information according to a query including a pair of an action type and whether the action is successful.

The action success or failure determination module 300 receives a pair of a video feature sequence and an action type identifier and outputs whether an action of the given video feature sequence is successful in connection with the action case memory module 200.

The learning module 400 optimizes factors of all the modules described above.

Figure 3:
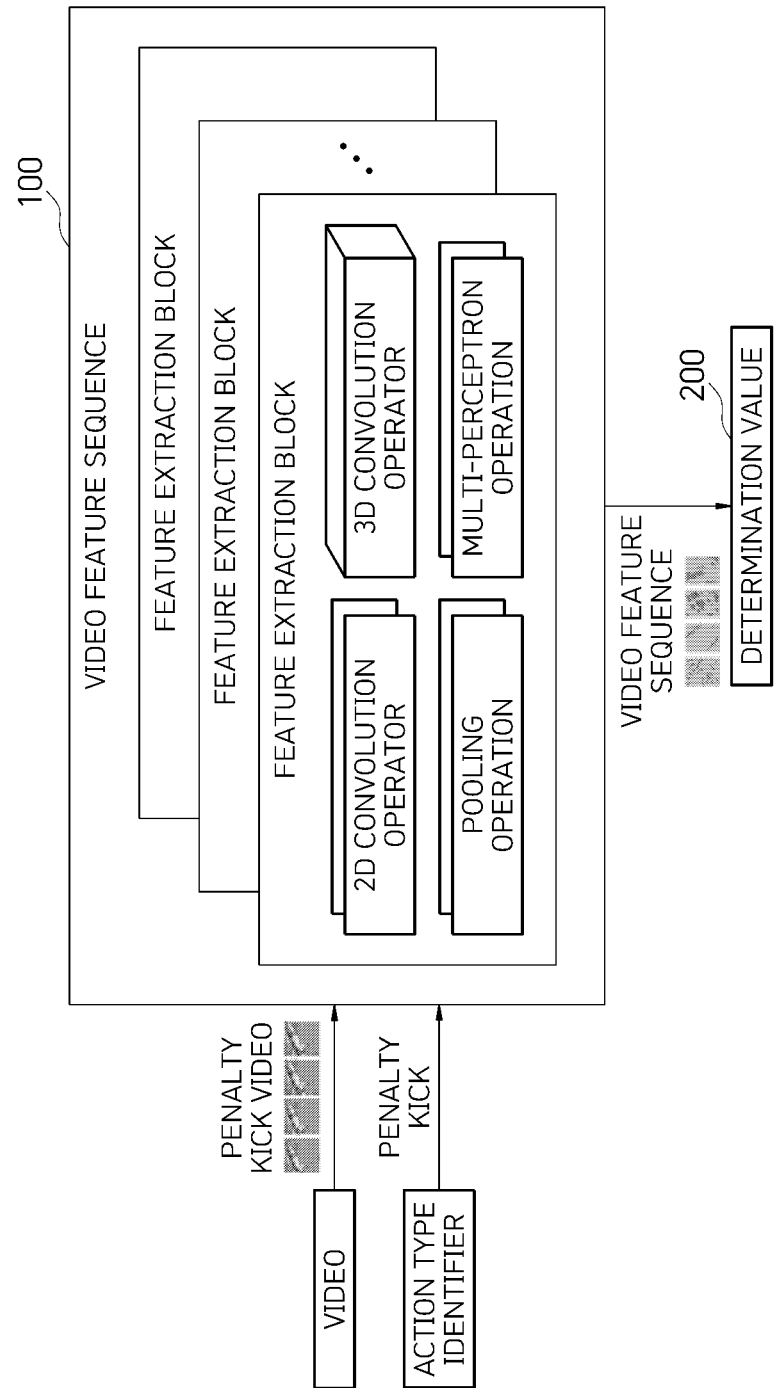
FIG. 3 is a reference diagram illustrating an example in which a video feature sequence having the same length as an image sequence is output when a video feature extraction module sets a single image as a feature extraction unit.

FIG. 3 is a reference diagram illustrating an example in which a video feature sequence having the same length as an image sequence is output when the video feature extraction module 100 sets a single image as a feature extraction unit.

The video feature extraction module 100 may set a single image as a video feature extraction unit and set a bundle of two or more images as one unit.

Here, various methods may be used for extracting features. The methods may include a 2D convolution operator or a 3D convolution operator, a pooling operation, and a multi-perceptron operation which are used in the image recognition field, and there are no limitations on the types and number of operators.

A video feature sequence which is an output of the video feature extraction module 100 is transmitted to the action success or failure determination module 300.

Figure 4:
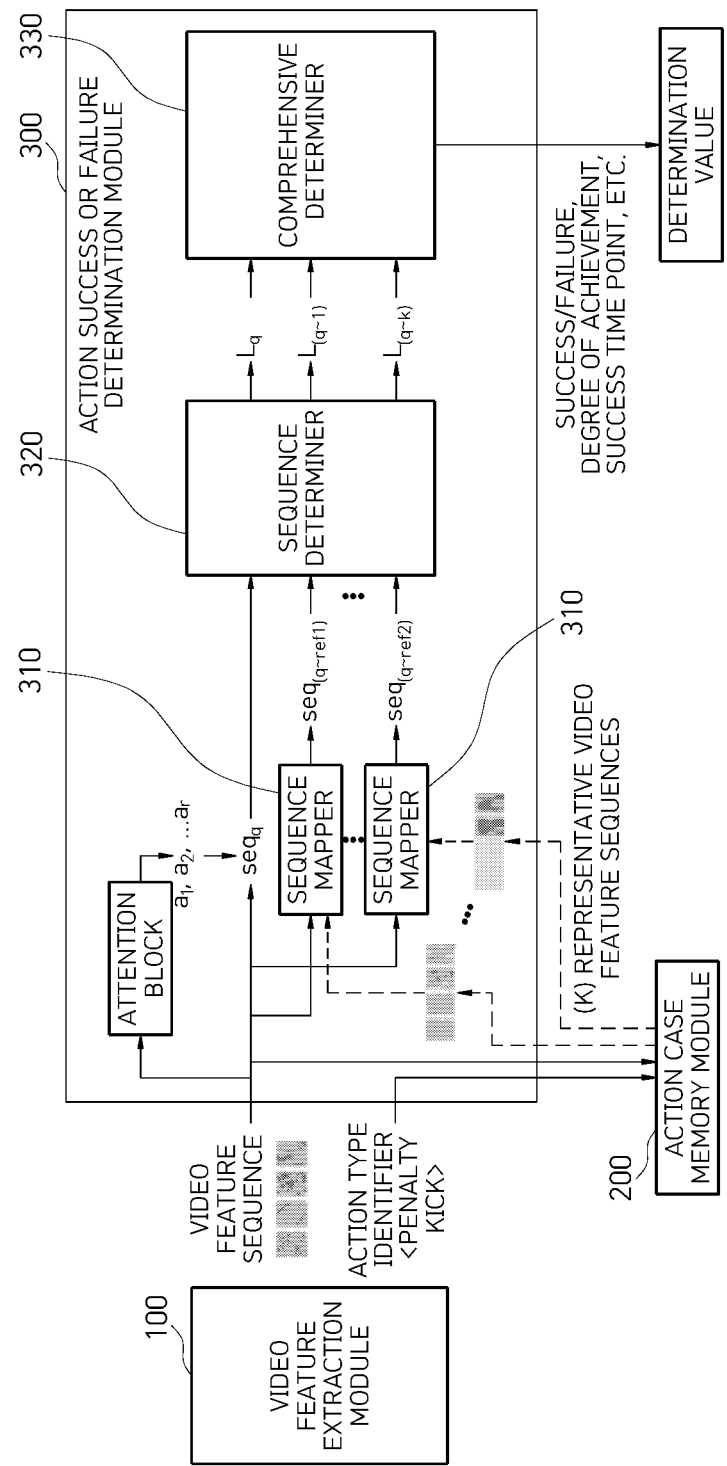
FIG. 4 is a reference diagram illustrating an operation process of an action success or failure determination module shown in FIG. 1.

FIG. 4 is a reference diagram illustrating an operation process of the action success or failure determination module shown in FIG. 1.

As shown in FIG. 4, the action success or failure determination module 300 receives a video feature sequence and action type identifier information from the video feature extraction module 100 and transmits the video feature sequence and the action type identifier information to the action case memory module 200.

The action success or failure determination module 300 passes a representative video feature sequence returned from the action case memory module 200 and the received video feature sequences through sequence mappers 310 to generate combined response sequences seq(q~ref1) to seq(q~refn).

Figure 5A:
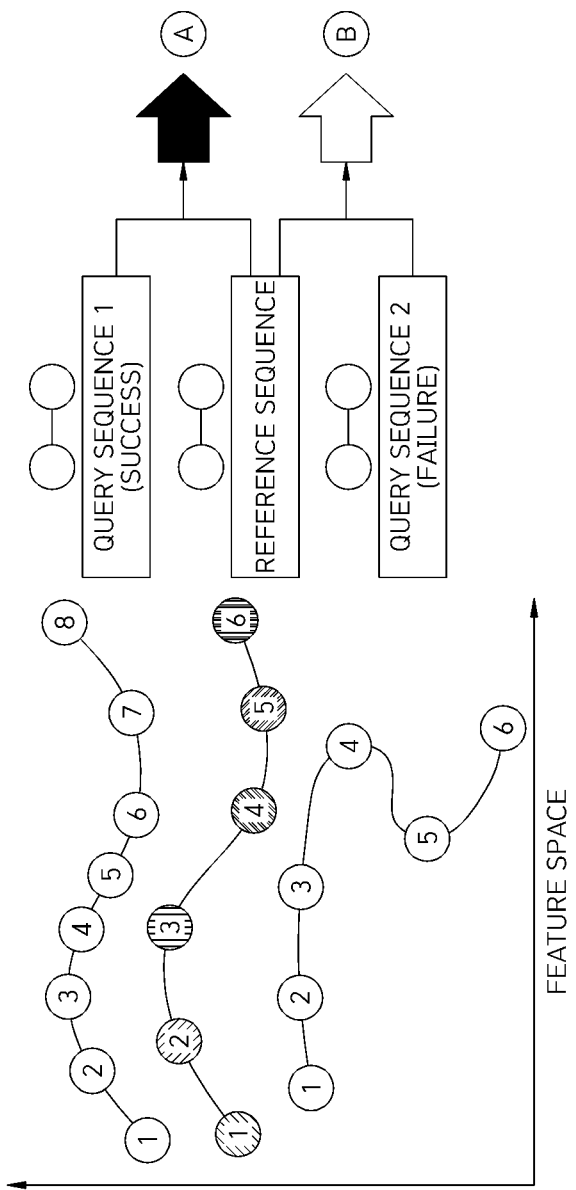
FIGS. 5A and 5B is a reference diagram illustrating an operation of a sequence mapper shown in FIG. 4.
Figure 5B:
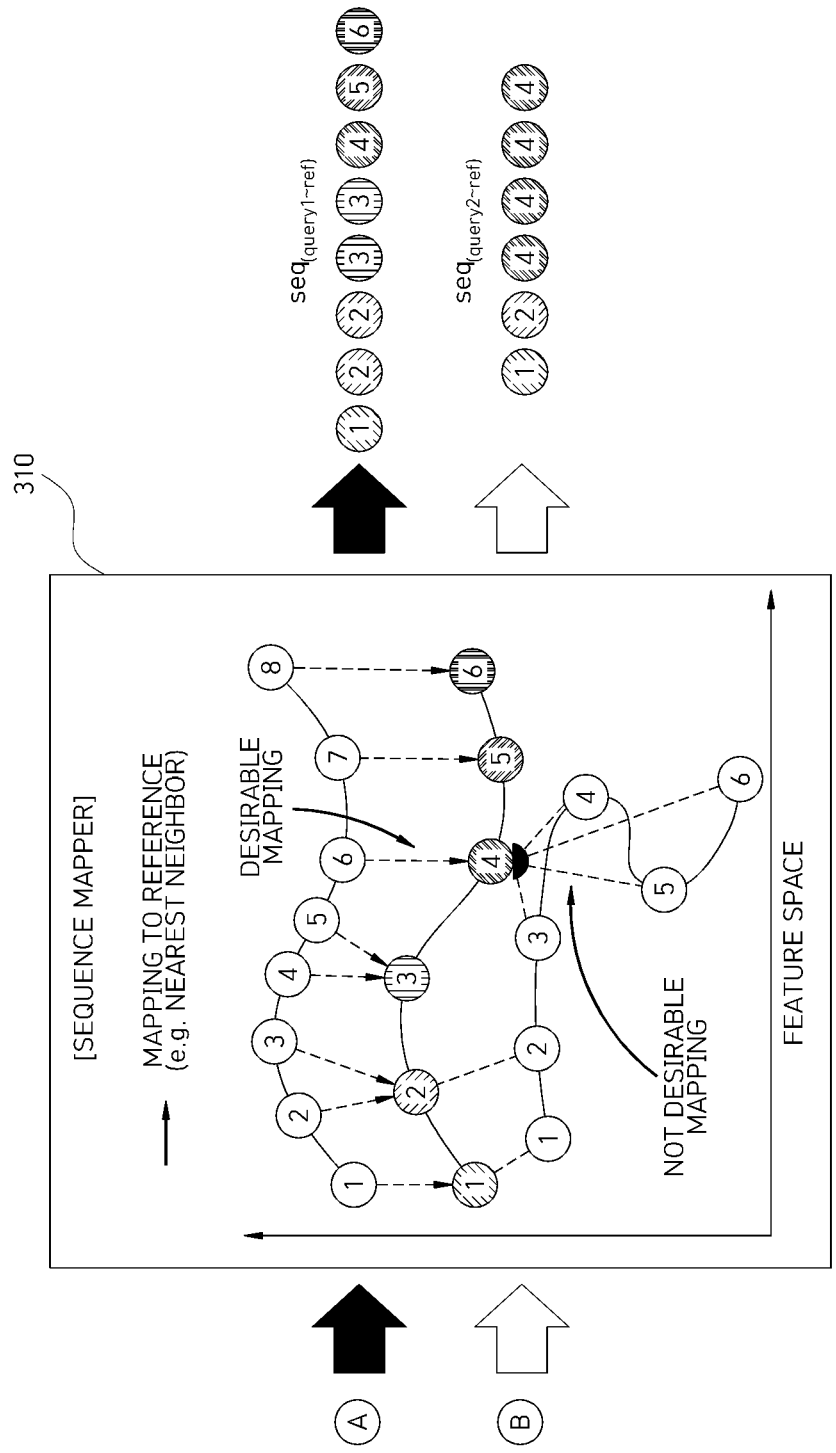

FIGS. 5A and 5B is a reference diagram illustrating an operation of a sequence mapper shown in FIG. 4.

As shown in FIGS. 5A and 5B, the sequence mapper 310 maps a query sequence represented in a feature space to a representative video feature sequence (reference sequence) to output a response sequence obtained by combining the two sequences. The mapping method may include various methods such as a method of finding the nearest neighbor among pieces of sequence configuration data. For example, as shown in FIGS. 5A and 5B, when video feature sequence 1 ("1, 2, 3, 4, 5, 6, 7, 8," success) and video feature sequence 2 (1, 2, 3, 4, 5, 6, failure) of an input video are input, the sequence mapper 310 outputs a combined response sequence using a reference sequence ("1, 2, 3, 4, 5, 6").

Here, the sequence mapper 310 maps video feature sequence 1 and video feature sequence 2 on the basis of the position of the reference sequence.

Therefore, 1 of video feature sequence 1 is mapped to 1 of the reference sequence, 2 and 3 of video feature sequence 1 are mapped to 2 of the reference sequence, 4 and 5 of video feature sequence 1 are mapped to 3 of the reference sequence, 6 of video feature sequence 1 is mapped to 4 of the reference sequence, 7 of video feature sequence 1 is mapped to 5 of the reference sequence, and 8 of video feature sequence 1 is mapped to 6 of the reference sequence so that the sequence mapper 310 outputs response sequence 1 corresponding to "1, 2, 2, 3, 3, 4, 5, 6."

Also, 1 of video feature sequence 2 is mapped to 1 of the reference sequence, 2 of video feature sequence 2 is mapped to 2 of the reference sequence, and 3, 4, 5, and 6 of video feature sequence 2 are mapped to 4 of the reference sequence so that the sequence mapper 310 outputs response sequence 2 corresponding to "1, 2, 4, 4, 4, 4."

As described above, the response sequences generated through the sequence mapper 310 and the received video feature sequence are transmitted to a sequence determiner 320.

A comprehensive determiner 330 outputs a final determination value for the received video feature sequence in consideration of all outputs of the sequence mappers 310.

The sequence determiner 320 and the comprehensive determiner 330 may include an operator for processing a data sequence having an arbitrary length and returning a value for a final determination and may be many-to-one recurrent neural networks.

FIG. 6 is a reference diagram illustrating a configuration and an operation process of the action case memory module 200 shown in FIG. 1.

As shown in FIG. 6, the action case memory module 200 stores representative video feature sequences extracted from videos according to action type identifiers to be recognized and returns the representative video feature sequence upon request.

In an action case memory 210, the action case memory module 200 may store an observed video itself or a result which is output when the video is input to the video feature extraction module 100.

Alternatively, data stored in the action case memory 210 by the action case memory module 200 may be data which represents feature extraction of videos of the same type of actions. For example, data stored in the action case memory 210 by the action case memory module 200 may be an average value of features extracted from all videos of a corresponding type of actions.

The action case memory 210 includes a representative video feature sequence obtained from one or more videos. However, the action case memory 210 does not store video data of all observed videos or all representative video feature sequences without change.

A memory updater 220 receives a representative video feature sequence of the video feature extraction module 100 and an action type identifier of the corresponding video and updates the stored action case memory 210. According to an update method, like reservoir sampling, it may be stochastically determined whether to store an input value in a memory, and when it is determined to store the value, one arbitrary action case which is currently in the memory may be replaced with the value. Alternatively, a moving average method for a representative feature vector may be used.

A memory search and selection part 230 returns a specific action type of memory from the action case memory 210. A request from the action success or failure determination module 300 includes an identifier of an action type and may include a feature of a video to be distinguished as necessary. When a feature sequence of the video to be distinguished is given for a search, a representative video feature sequence set being returned may vary on the basis of the similarity between a sequence in the action case memory 210 and the received video feature sequence.

Figure 7:
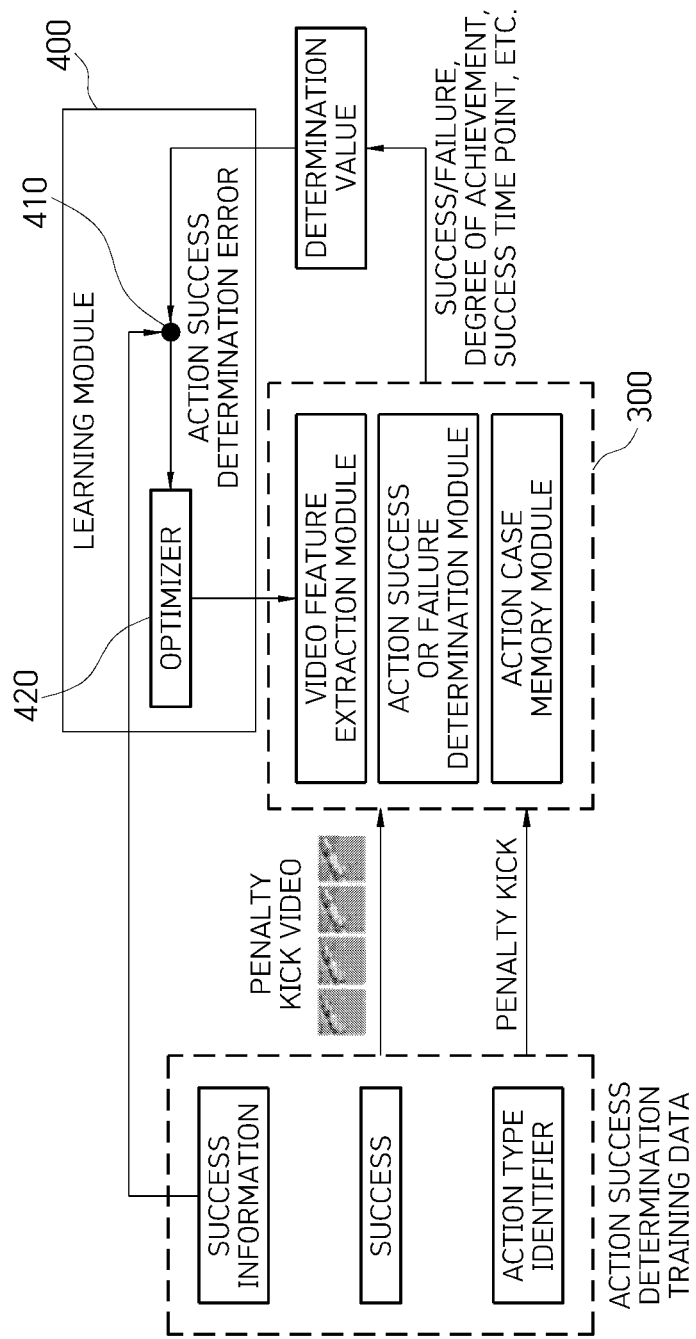
FIG. 7 is a reference diagram illustrating a configuration and an operation process of a learning module shown in FIG. 1.

FIG. 7 is a reference diagram illustrating a configuration and an operation process of a learning module shown in FIG. 1.

Here, action success determination training data may include video data, in-video action information, and information representing a success determination result in the basic form of <video, action type identifier, success information> and may further include additional information such as a criterion for action success.

As shown in FIG. 7, an action success determiner 410 determines an action success determination error which is a difference between an action success determination value, which is output when a video, action information, and optionally additional information, such as the criterion for action success, are passed through the above-described module, and an action success determination value in training data. For example, when a success determination value is represented as 1 or 0, the error may be defined using a method such as mean absolute error (MAE) or root mean squared error (RMSE).

An optimizer 420 optimizes factors of the video feature extraction module 100, the action success or failure determination module 300, and the action case memory module 200 when the action success determination training data is given so that the action success determination error may be minimized. A method, such as gradient descent, may be selected as the optimization method.

Figure 8:
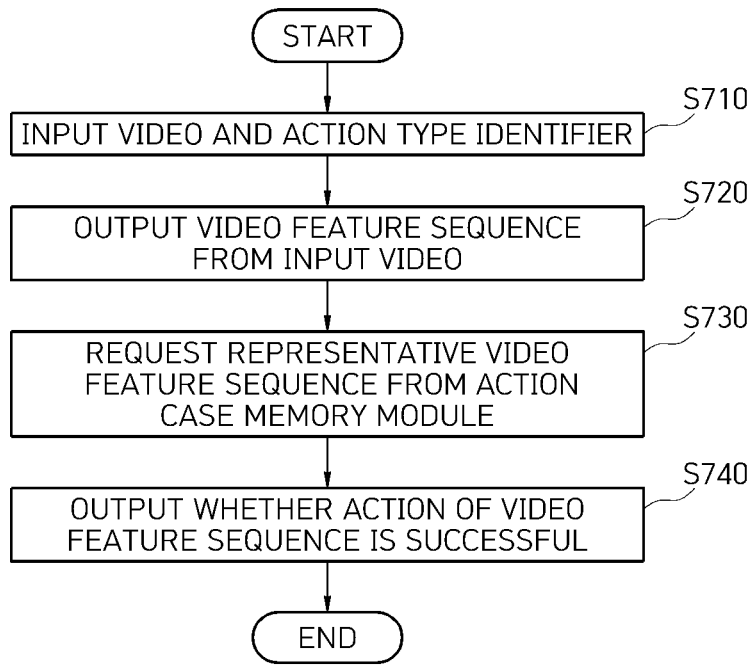
FIG. 8 is a flowchart illustrating a method of recognizing whether an action objective is achieved according to an exemplary embodiment of the present invention.

A method of recognizing whether an action objective is achieved according to an exemplary embodiment of the present invention will be described below with reference to FIG. 8.

First, a video and an action type identifier are input to the video feature extraction module (S710).

Subsequently, the video feature extraction module outputs a video feature sequence from the input video through a convolution operator (S720). Meanwhile, the operation S720 of extracting a feature from a video may employ one of a 2D convolution operator, a 3D convolution operator, a pooling operation, and a multi-perceptron operation which are used in the image recognition field.

Then, a representative video feature sequence is requested from the action case memory module using the input action type identifier and the video feature sequence (S730).

Subsequently, whether an action of the video feature sequence input through the video feature extraction module is successful is output using the representative video feature sequence provided by the action case memory module (S740).

According to the exemplary embodiment of the present invention, it is unnecessary to create an explicit condition for the success of an action, and a determination model with high performance can be trained at a lower data building cost.

Also, the present invention makes it possible to determine not only whether an action for a posture is successful by recognizing the skeletal structure of a person appearing in a video but also whether a general action, such as movement of an object or interaction between an object and a person, is successful. For example, it is possible to determine whether an action is successful, such as whether robotic assembly is successful, whether a penalty kick is successful in a soccer game, and whether a pole vault is successful, in consideration of circumstances as well as a person's posture.

Further, the present invention presents a given video in association with a success or failure video using a memory in which information about success and failure cases is compressed. Accordingly, it is highly possible to describe the reason that a given video is determined to be successful, and model reliability can be improved.

Sub-operations of the operation S740 of determining whether an action is successful according to the exemplary embodiment of the present invention will be described below.

First, a query sequence represented in a feature space is mapped to representative video feature sequences to output reference sequences obtained by combining two sequences (S741).

Subsequently, the reference sequences output from the sequence mappers are input, and input video feature sequences (Lq to Lqk) are output (S742).

Subsequently, a final determination value for the input video feature sequence is output in consideration of the input video feature sequences Lq to Lqk for the sequence mappers (S743). Here, the operation S742 of outputting the input video feature sequences and the operation S743 of outputting the final determination value may include an operator for processing a data sequence having an arbitrary length and returning a value for a final determination and may be performed through many-to-one recurrent neural networks.

Figure 9:
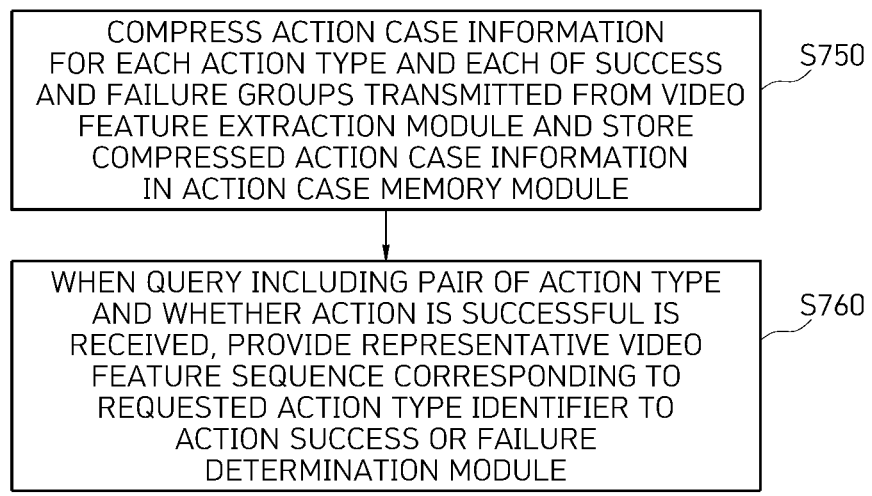
FIG. 9 is a flowchart illustrating operations of an action case memory which stores and manages an input video and an action type identifier in FIG. 8.

FIG. 9 is a flowchart illustrating a learning process according to an exemplary embodiment of the present invention.

the action success or failure determination module compresses and stores action case information for each action type and each of success and failure groups transmitted from the video feature extraction module in the action case memory module (S750).

When a query including a pair of an action type and whether the action is successful is received, the action case memory module provides a representative video feature sequence corresponding to a requested action type identifier to the action success or failure determination module (S760).

An exemplary embodiment of the present invention further includes an operation S770 of generating action success determination training data using the final determination value, which corresponds to success information and is output through the comprehensive determiner, and training each of the sequence mappers, the sequence determiner, and the comprehensive determiner using a factor of the generated action success determination training data.

Here, the action success determination training data may include video data, in-video action information, and information representing a success determination result in the basic form of <video, action type identifier, success information> and may further include additional information such as a criterion for action success.

Figure 10:
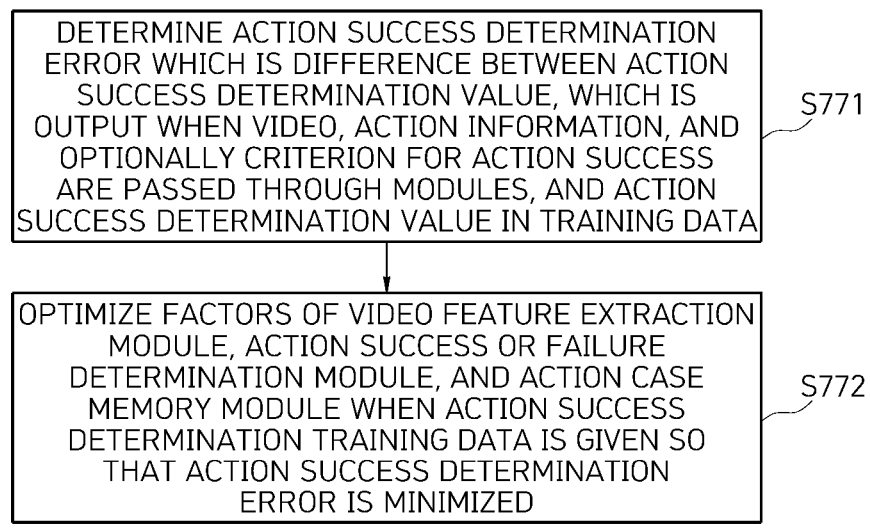
FIG. 10 is a flowchart illustrating a learning process according to an exemplary embodiment of the present invention.

As shown in FIG. 10, In the operation S770 of training each of the sequence mappers, the sequence determiner, and the comprehensive determiner, an action success determination error may be determined which is a difference between an action success determination value, which is output when the video, the action information, and optionally additional information, such as the criterion for action success, are passed through the above-described module, and an action success determination value in training data (S771).

Subsequently, when action success determination training data is given, factors of the video feature extraction module, the action success or failure determination module, and the action case memory module are optimized so that the action success determination error may be minimized (S772).

According to an exemplary embodiment of the present invention, it is unnecessary to create an explicit condition for the success of an action, and a determination model with high performance can be trained at a low data building cost.

Also, the present invention makes it possible to determine not only whether an action for a posture is successful by recognizing the skeletal structure of a person appearing in a video but also whether a general action, such as movement of an object or interaction between an object and a person, is successful. For example, it is possible to determine whether an action is successful, such as whether robotic assembly is successful, whether a penalty kick is successful in a soccer game, and whether a pole vault is successful in consideration of circumstances as well as a person's posture.

Further, the present invention presents a given video in association with a success or failure video using a memory in which information about success and failure cases is compressed. Accordingly, it is highly possible to describe the reason that the given video is determined to be successful, and model reliability can be improved.

Each step included in the learning method described above may be implemented as a software module, a hardware module, or a combination thereof, which is executed by a computing device.

Also, an element for performing each step may be respectively implemented as first to two operational logics of a processor.

The software module may be provided in RAM, flash memory, ROM, erasable programmable read only memory (EPROM), electrical erasable programmable read only memory (EEPROM), a register, a hard disk, an attachable/detachable disk, or a storage medium (i.e., a memory and/or a storage) such as CD-ROM.

An exemplary storage medium may be coupled to the processor, and the processor may read out information from the storage medium and may write information in the storage medium. In other embodiments, the storage medium may be provided as one body with the processor.

The processor and the storage medium may be provided in application specific integrated circuit (ASIC). The ASIC may be provided in a user terminal. In other embodiments, the processor and the storage medium may be provided as individual components in a user terminal.

Exemplary methods according to embodiments may be expressed as a series of operation for clarity of description, but such a step does not limit a sequence in which operations are performed. Depending on the case, steps may be performed simultaneously or in different sequences.

In order to implement a method according to embodiments, a disclosed step may additionally include another step, include steps other than some steps, or include another additional step other than some steps.

Various embodiments of the present disclosure do not list all available combinations but are for describing a representative aspect of the present disclosure, and descriptions of various embodiments may be applied independently or may be applied through a combination of two or more.

Moreover, various embodiments of the present disclosure may be implemented with hardware, firmware, software, or a combination thereof. In a case where various embodiments of the present disclosure are implemented with hardware, various embodiments of the present disclosure may be implemented with one or more application specific integrated circuits (ASICs), digital signal processors (DSPs), digital signal processing devices (DSPDs), programmable logic devices (PLDs), field programmable gate arrays (FPGAs), general processors, controllers, microcontrollers, or microprocessors.

The scope of the present disclosure may include software or machine-executable instructions (for example, an operation system (OS), applications, firmware, programs, etc.), which enable operations of a method according to various embodiments to be executed in a device or a computer, and a non-transitory computer-readable medium capable of being executed in a device or a computer each storing the software or the instructions.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

Although the exemplary embodiments of the present invention have been described in detail above with reference to the accompanying drawings, the embodiments are merely illustrative, and various modifications and alterations can be made by those of ordinary skill in the art without departing from the technical scope of the present invention. Therefore, the scope of the present invention is defined not by the above-described embodiments but by the following claims.

What is claimed is:

1. An apparatus for recognizing whether an action objective is achieved, the apparatus comprising:
    a processor,
    a video feature extraction module configured, via the processor, to receive a video and output a video feature sequence through an operator such as a convolution operator;
    an action case memory module configured, via the processor, to compress and store action case information for each action type and each of success and failure groups transmitted from the video feature extraction module and return the action case information according to a query including a pair of an action type and whether an action is successful; and
    an action success or failure determination module configured, via the processor, to receive a pair of a video feature sequence and an action type identifier and output whether an action of the given video feature sequence is successful in connection with the action case memory module,
    wherein, the action case memory module comprises,
    an action case memory which includes a representative video feature sequence obtained from one or more videos and does not store video data of all observed videos or all representative video feature sequences without change,
    a memory updater configured, via the processor, to receive a representative video feature sequence of the video feature extraction module and an action type identifier of the corresponding video and updates the stored action case memory and an update method of reservoir sampling, which stochastically determine whether to store an input value in a memory, and when it is determined to store the value, one arbitrary action are which is currently in the memory is replaced with the value, and
    a memory search and selection part configured, via the processor, to return a specific action type of memory from the action case memory.

2. The apparatus of claim 1, wherein the received video includes a two-dimensional (2D) or three-dimensional (3D) video or a bundle of at least one image.

3. The apparatus of claim 1, wherein the received video is one of a pre-stored video file and a continuously stored streaming video such as a closed-circuit television (CCTV) video.

4. The apparatus of claim 1, wherein the video feature extraction module, via the processor, sets a single image as a video feature extraction unit and sets a bundle of two or more images as one unit.

5. The apparatus of claim 4, wherein a method of extracting features of the video uses one of a two-dimensional (2D) convolution operator, a three-dimensional (3D) convolution operator, a pooling operation, and a multi-perceptron operation which are used in an image recognition field.

6. The apparatus of claim 1, wherein the action success or failure determination module receives the video feature sequence and information on the action type identifier from the video feature extraction module, transmits the video feature sequence and the information on the action type identifier to the action case memory module, and generates, via the processor, a combined response sequence by passing a representative video feature sequence returned from the action case memory module and the received video feature sequence through a sequence mapper.

7. The apparatus of claim 1, wherein the action success or failure determination module comprises:
    sequence mappers configured, via the processor, to output reference sequences, in which a query sequence represented in a feature space and a representative video feature sequence are combined by mapping the query sequence to the representative video feature sequence;
    a sequence determiner configured, via the processor, to receive the reference sequences output from the sequence mapper and output video feature sequences; and
    a comprehensive determiner configured, via the processor, to output a final determination value for the video feature sequences in consideration of outputs of the video feature sequences for each of the sequence mappers.

8. The apparatus of claim 7, wherein the sequence determiner and the comprehensive determiner include an operator for processing a data sequence having an arbitrary length and returning a value for a final determination and are many-to-one recurrent neural networks.

9. The apparatus of claim 7, further comprising a learning module configured, via the processor, to generate action success determination training data using the final determination value, which corresponds to success information and is output through the comprehensive determiner, and learn a factor of each of the sequence mappers, the sequence determiner, and the comprehensive determiner.

10. The apparatus of claim 9, wherein the action success determination training data includes video data, in-video action information, and information representing a success determination result in a basic form of <video, action type identifier, success information> and further includes additional information such as a criterion for action success.

11. The apparatus of claim 10, wherein the learning module comprises:
    an action success determiner configured, via the processor, to determine an action success determination error which is a difference between an action success determination value, which is output when the video, action information, and optionally additional information, such as a criterion for action success, are passed through the above module, and an action success determination value in training data; and
    an optimizer configured, via the processor, to optimize factors of the video feature extraction module, the action success or failure determination module, and the action case memory module when action success determination training data is given so that the action success determination error is minimized.

12. A method of recognizing whether an action objective is achieved, the method comprising:

receiving, by a video feature extraction module, a video and an action type identifier;

outputting, by the video feature extraction module, a video feature sequence from the received video through a convolution operator;

requesting a representative video feature sequence from an action case memory module using the received action type identifier and the video feature sequence; and outputting whether an action of the video feature sequence input through the video feature extraction module is successful using the representative video feature sequence provided by the action case memory module, wherein, the action case memory module comprises, an action case memory which includes a representative video feature sequence obtained from one or more videos and does not store video data of all observed videos or all representative video feature sequences without change, a memory updater receives a representative video feature extraction module and an action type identifier of the corresponding video and updates the stored action case memory and an update method of reservoir sampling, which stochastically determine whether to store an input value in a memory, and when it is determined to store the value, one arbitrary action case which is currently in the memory is replaced with the value, and a memory search and selection part returns a specific action type of memory from the action case memory.

13. The method of claim 12, further comprising:

compressing, by an action success or failure determination module, action case information for each action type and each of success and failure groups transmitted from the video feature extraction module and storing the compressed action case information in the action case memory module; and when a query including a pair of an action type and whether an action is successful is received, providing, by the action case memory module, a representative video feature sequence corresponding to a requested action type identifier to the action success or failure determination module.

14. The method of claim 13, wherein the outputting of the video feature sequence uses one of a two-dimensional (2D) convolution operator, a three-dimensional (3D) convolution operator, a pooling operation, and a multi-perceptron operation which are used in an image recognition field.

15. The method of claim 12, wherein the outputting of whether the action of the video feature sequence is successful comprises:

outputting reference sequences, in which a query sequence represented in a feature space and a representative video feature sequence are combined by mapping the query sequence to the representative video feature sequence;

receiving the reference sequences output from sequence mappers and outputting video feature sequences; and outputting a final determination value for the video feature sequences in consideration of outputs of the video feature sequences for each of the sequence mappers.

16. The method of claim 15, wherein the outputting of the video feature sequences and the outputting of the final determination value uses an operator for processing a data sequence having an arbitrary length and returning a value for a final determination and are performed through a many-to-one recurrent neural network.

17. The method of claim 15, further comprising:

generating action success determination training data using a final determination value which corresponds to success information and is output through a comprehensive determiner; and training each of the sequence mappers, the sequence determiner, and the comprehensive determiner using a factor of the generated action success determination training data.

18. The method of claim 17, wherein the action success determination training data includes video data, in-video action information, and information representing a success determination result in a basic form of <video, action type identifier, success information> and further includes additional information such as a criterion for action success.

19. The method of claim 18, wherein the training of each of the sequence mappers, the sequence determiner, and the comprehensive determiner comprises:

determining an action success determination error which is a difference between an action success determination value, which is output when the video, action information, and optionally additional information, such as the criterion for action success, are passed through the above module, and an action success determination value in training data; and optimizing factors of the video feature extraction module, the action success or failure determination module, and the action case memory module when action success determination training data is given so that the action success determination error is minimized.

* * * * *